United States Patent [19]
Chang et al.

[11] Patent Number: 5,464,190
[45] Date of Patent: Nov. 7, 1995

[54] FOOT-OPERATED VALVE

[76] Inventors: Fang-Hsiung Chang, No. 11, Lane 105, Tung-An St., Feng-Yung City, Taichung Hsien; Wen-Bin Wang, No. 312, Chung-San Rd., Taichung City, both of Taiwan

[21] Appl. No.: 271,518

[22] Filed: Jul. 7, 1994

[51] Int. Cl.⁶ ............................. F16K 31/62; F16K 35/02
[52] U.S. Cl. ............................................ 251/74; 251/295
[58] Field of Search ........................................ 251/74, 295

[56] References Cited

U.S. PATENT DOCUMENTS

| | | | |
|---|---|---|---|
| 1,004,467 | 9/1911 | Renwick, Jr. | 251/295 X |
| 1,230,590 | 6/1917 | Mason | 251/74 X |
| 1,467,450 | 9/1923 | Pfleger | 251/74 |
| 1,525,393 | 2/1925 | Jernatowski | 2581/74 X |
| 1,562,979 | 11/1925 | Muend | 251/295 X |
| 2,497,558 | 2/1950 | Reeves | 251/74 X |
| 3,802,459 | 4/1974 | Geraudie | 251/74 X |
| 5,159,950 | 11/1992 | Wang | 251/74 X |

*Primary Examiner*—John Rivell
*Attorney, Agent, or Firm*—Knobbe, Martens, Olson & Bear

[57] ABSTRACT

A foot-operated valve includes a valve set with a hollow seat and a push rod that extends movably and slidably into the hollow seat and that has a bottom end with a plug provided therearound. The push rod is biased so that the plug blocks normally a distal bottom end of a tubular sleeve that is secured in the hollow seat. When downward pressure is applied on the push rod, the plug ceases to block the bottom end of the tubular sleeve to permit communication between outlet and inlet pipe connectors of the hollow seat. A retaining plate is biased by an extension spring so as to engage the push rod when the push rod moves downwardly, thereby maintaining communication between the outlet and inlet pipe connectors even when the downward pressure applied on the push rod is extinguished. A switch assembly is operable selectively so as to pull the retaining plate away from the push rod to permit the push rod to move upwardly and enable the plug to once more block the bottom end of the tubular sleeve to block communication between the outlet and inlet pipe connectors.

15 Claims, 7 Drawing Sheets

FOOT-OPERATED VALVE

BACKGROUND OF THE INVENTION

1. Field of the Invention

The invention relates to a valve, more particularly to a foot-operated valve for faucets and the like.

2. Description of the Related Art

Presently, the control of water flow through most faucets installed in public places, such as in hospitals and public toilets, is usually accomplished by rotating a handle or by applying pressure on a lever. Thus, the risk of being infected with a disease is relatively high because of the need to operate the faucet by hand. In order to overcome this drawback, some establishments have installed faucets which incorporate a sensor to control water flow. However, such faucets can only provide a predetermined amount of water when in use and is incapable of satisfying the water needs of different people.

One of the applicants of the present invention has disclosed in co-pending U.S. patent application Ser. No. 08/199,885, filed on Feb. 22, 1994, a foot-operated valve which is convenient to use, which can minimize the risk of infection because it obviates the need for operating the same by hand, and which can be used to provide varying amounts of water to satisfy the needs of different people. The foot-operated valve comprises a valve housing, a valve stem, a spring means, a base, a push rod and a pedal. The valve housing is formed with a longitudinal bore which includes a front section and a rear section that has an internal diameter wider than that of the front section to form a shoulder which serves as a valve seat therebetween. The longitudinal bore has an open front end and a closed rear end. The valve housing is further formed with a water inlet hole that is communicated with the rear section of the longitudinal bore, and a water outlet hole that is communicated with the front section of the longitudinal bore. The valve stem extends into the longitudinal bore and is provided with a valve disc which is disposed in the rear section of the longitudinal bore. The valve stem has a front portion which extends sealingly through the open front end of the longitudinal bore. The spring means biases the valve disc to abut normally against the valve seat so as to block normally communication between the front and rear sections of the longitudinal bore. The base has the valve housing secured thereon and is provided with an upwardly extending mounting seat disposed adjacent to the valve housing. The base is formed with a cylindrical hole that is aligned with the valve stem. The push rod is received slidably in the cylindrical hole and has a head portion and a shank portion. The shank portion abuts against the front portion of the valve stem. The pedal has a rear end connected pivotally to the mounting seat and a bottom surface provided with a downwardly extending push plate that abuts against the head portion of the push rod. The pedal pivots when pressure is applied thereon, thereby causing the push plate to push the push rod further into the cylindrical hole so as to push the valve stem inwardly of the longitudinal bore to move the valve disc away from the valve seat against action of the spring means to permit water entering the rear section of the longitudinal bore via the water inlet hole to flow through the water outlet hole via the front section of the longitudinal bore.

Although the foot-operated valve can overcome the drawbacks of conventional water flow control devices commonly installed in faucets, there is still some room for improvement. For example, pressure must be applied on the pedal of the foot-operated valve continuously to obtain a continuous flow of water, thereby making the foot-operated valve somewhat inconvenient to use. Furthermore, the foot-operated valve is not adapted for use in a hot-and-cold water faucet system.

SUMMARY OF THE INVENTION

Therefore, the main object of the present invention is to provide an improved foot-operated valve which is to be incorporated in faucets and the like and which permits the continuous flow of water without the need for applying pressure continuously thereto.

Another object of the present invention is to provide an improved foot-operated valve which is adapted for use in a hot-and-cold water faucet system.

Accordingly, the foot-operated valve of the present invention comprises a housing, a support plate, a first valve set, a retaining plate unit, an extension spring means and a switch assembly. The housing has an open top, a closed bottom and a surrounding wall formed with a first set of water outlet and inlet holes. One of the water outlet and inlet holes is disposed at a level higher than the other one of the water outlet and inlet holes. The support plate is mounted on the open top of the housing and is formed with a first hole.

The first valve set includes a hollow seat, a tubular sleeve, a push rod, and a compression spring. The hollow seat is secured in the housing below the support plate and has an upright tube portion with an open top and a closed bottom. The tube portion confines an interior and is formed with radially extending outlet and inlet pipe connectors aligned with the first set of water inlet and outlet holes and communicated with the interior of the tube portion. The tubular sleeve is secured to and extends into the tube portion. The sleeve confines an axial through-hole and is formed with a passage means to communicate the through-hole and the outlet pipe connector. The push rod extends sealingly and slidably through the tubular sleeve and into the tube portion of the hollow seat. The push rod has a top end which extends out of the open top of the housing via the first hole of the support plate and a bottom end which has a plug secured therearound. The push rod is formed with an annular peripheral groove immediately above the plug and a radial first retaining unit adjacent the top end. The compression spring is provided in the upright tube portion and is interposed between the closed bottom of the tube portion and the push rod to bias the push rod upwardly so that the plug closes normally a distal bottom end of the tubular sleeve. When pressure is applied on the top end of the push rod against action of the compression spring, the plug moves away from the distal bottom end of the tubular sleeve so as to permit water entering the inlet pipe connector to reach the outlet pipe connector via the interior of the tube portion, the annular peripheral groove of the push rod, and the through-hole and the passage means of the tubular sleeve.

The retaining plate unit is disposed below the support plate and includes an elongated first plate which is supported movably by the support plate and which is movable in a lateral direction towards and away from the push rod of the first valve set. The first plate has a rear end and a front end formed with a second retaining unit. The extension spring means biases the second retaining unit of the first plate toward the push rod of the first valve set to enable the second retaining unit to engage the first retaining unit on the push rod when pressure is applied on the top end of the push rod. The switch assembly includes a first switch means operable selectively so as to pull the first plate against action of the extension spring means in order to disengage the second retaining unit from the first retaining unit, thereby permitting the compression spring to bias the push rod so that the plug closes the distal bottom end of the tubular sleeve.

In one embodiment of the present invention, the surrounding wall of the housing is further formed with a second set of water outlet and inlet holes, and the foot-operated valve further comprises a second valve set similar to the first valve set in construction. The second valve set has a hollow seat with an upright tube portion that is formed with radially extending outlet and inlet pipe connectors aligned with the second set of water inlet and outlet holes, and a push rod which extends movably into the tube portion of the hollow seat and which is formed with the radial first retaining unit. The retaining plate unit further includes an elongated second plate supported movably by the support plate and movable in a lateral direction towards and away from the push rod of the second valve set. The second plate has a rear end and a front end formed with the second retaining unit. The extension spring means further biases the second retaining unit of the second plate toward the push rod of the second valve set to enable the second retaining unit of the second plate to engage the first retaining unit on the push rod of the second valve set when pressure is applied on the push rod of the second valve set. The switch assembly further includes a second switch means operable selectively so as to pull the second plate against action of the extension spring means in order to disengage the second retaining unit of the second plate from the first retaining unit on the push rod of the second valve set.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Before the present invention is described in greater detail, it should be noted that like elements are indicated by the same reference numerals throughout the disclosure.

Figure 1:
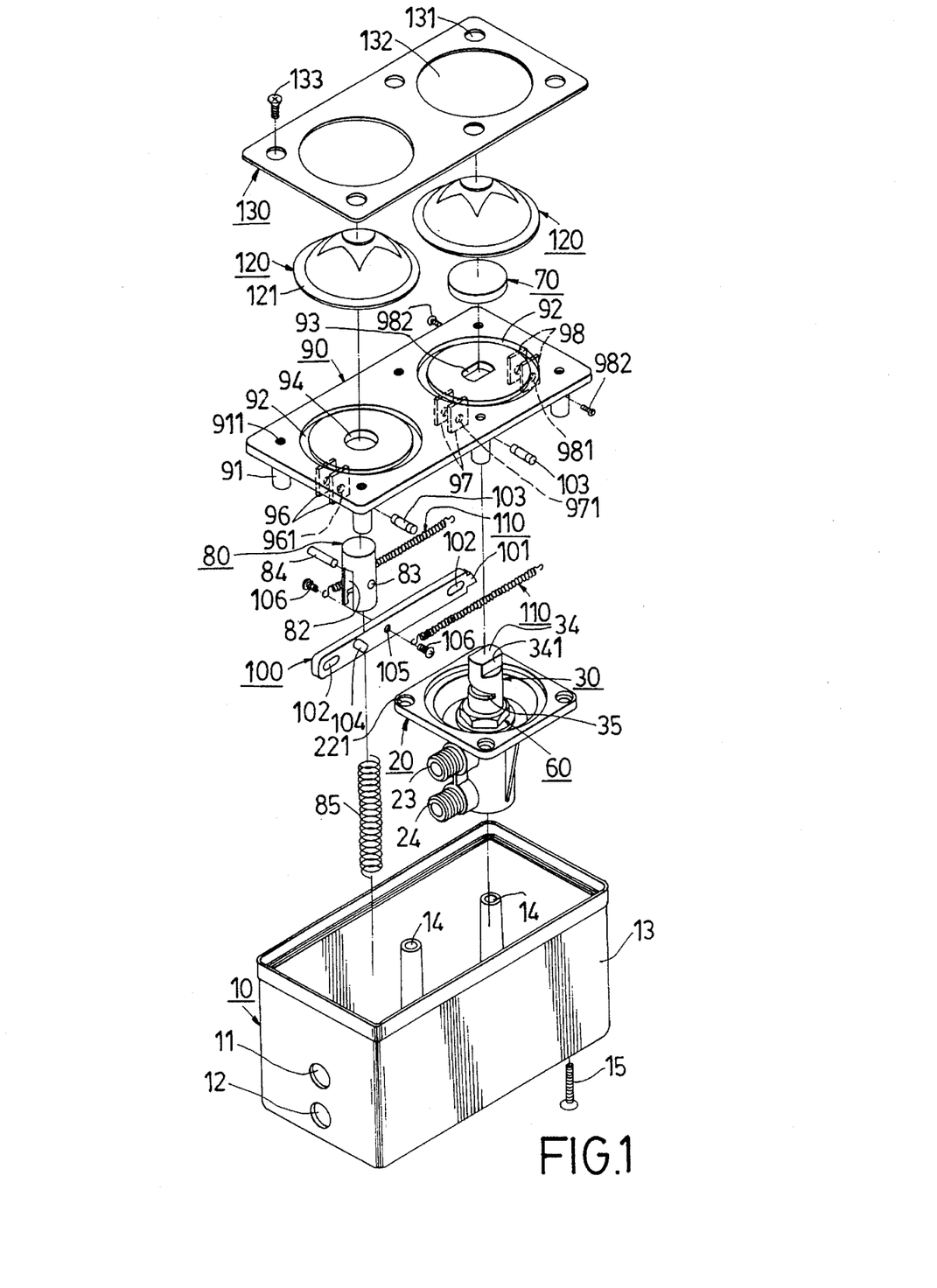
FIG. 1 is an exploded view of the first preferred embodiment of a foot-operated valve according to the present invention.
Figure 2:
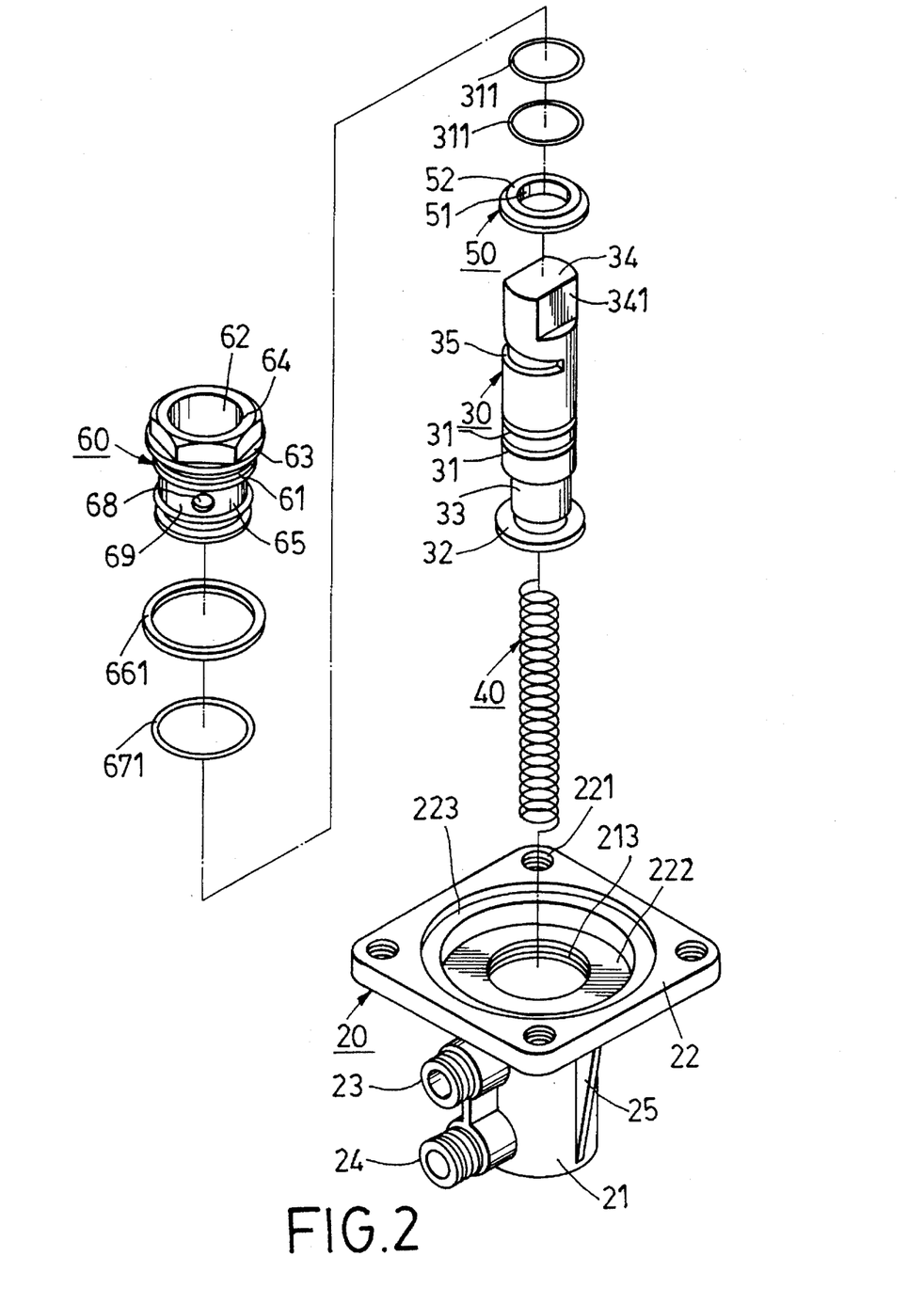
FIG. 2 is an exploded view showing a valve set of the first preferred embodiment.
Figure 3:
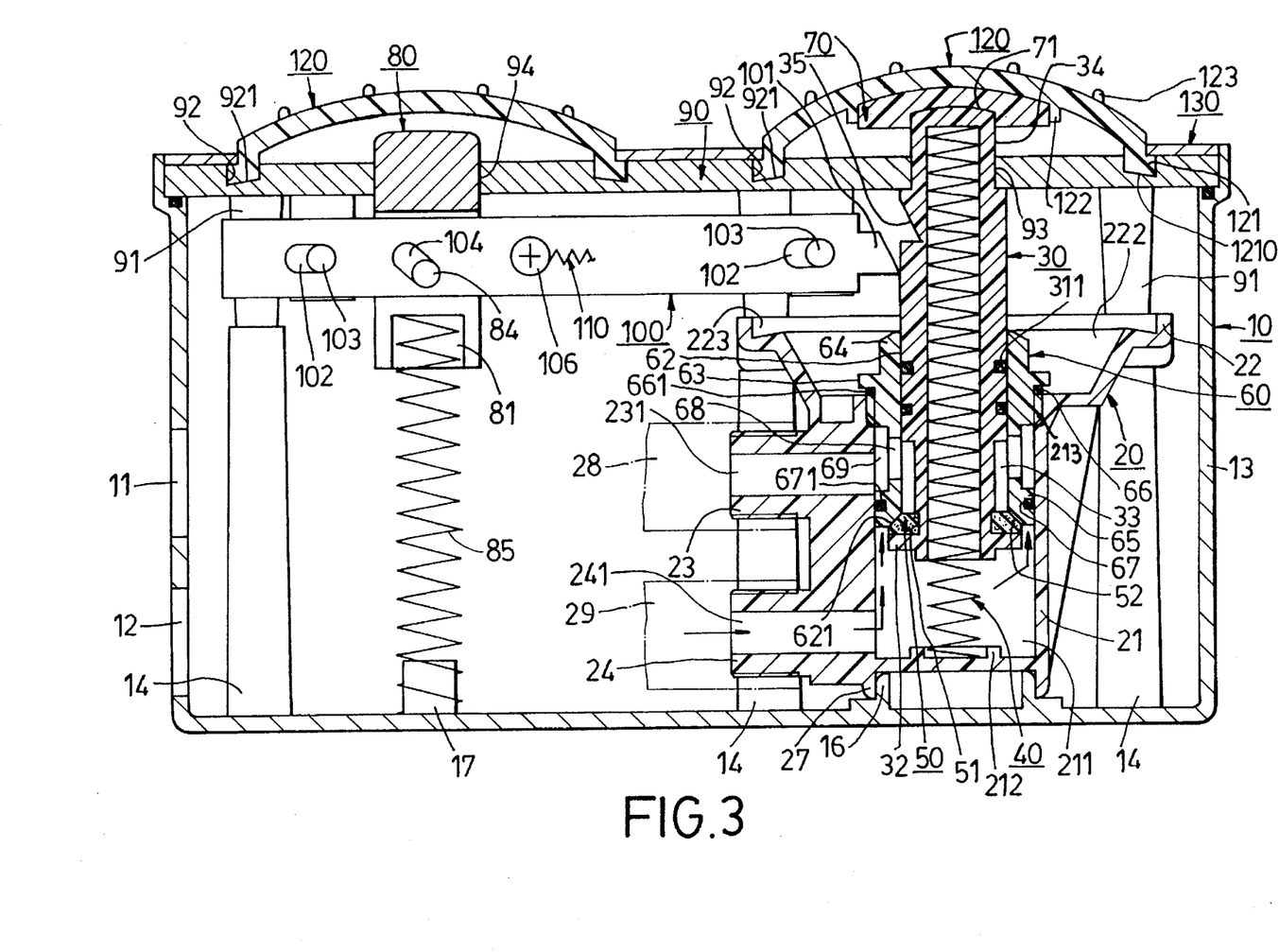
FIG. 3 is sectional view which illustrates the first preferred embodiment when in a closed state.

Referring to FIGS. 1 to 3, the first preferred embodiment of a foot-operated valve according to the present invention is shown to comprise a housing 10, a valve set, a bearing plate 70, a switch assembly, a support plate 90, a retaining plate 100, two extension springs 110, two resilient cups 120 and a top cover 130.

The housing 10 is a rectangular hollow body with an open top, a closed bottom and a surrounding wall 13 formed with a set of water outlet and inlet holes 11, 12. In this embodiment, the water outlet hole 11 is aligned vertically with and is disposed above the water inlet hole 12. Six hollow upright posts 14 (only two are shown in FIG. 1) are formed on an inner wall surface of the surrounding wall 13 such that the top ends of the upright posts 14 are spaced from a topmost periphery of the surrounding wall 13. The closed bottom of the housing 10 has an upwardly protruding annular retaining projection 16 and an upwardly protruding retaining stub 17.

The valve set includes a hollow seat 20, a push rod 30, a first compression spring 40, a plug 50 and a tubular sleeve 60.

The hollow seat 20 is secured in the housing 10 and has an upright tube portion 21 and a rectangular mounting portion 22 formed integrally on a top end of the tube portion 21. The mounting portion 22 has a top face formed with four locking holes 221 and a circular central recess 222 which is communicated with the interior 211 of the tube portion 21. The tube portion 21 has a closed bottom that is formed with an upwardly protruding annular retaining projection 212. The top end of the tube portion 21 is formed with an internal thread 213. The mounting portion 22 is further formed with an annular groove 223 which is disposed around and communicated with the recess 222. The tube portion 21 is further formed with radially extending outlet and inlet pipe connectors 23, 24 aligned with the water outlet and inlet holes 11, 12 of the housing 10. The interiors 231, 241 of the outlet and inlet pipe connectors 23, 24 are communicated with the interior 211 of the tube portion 21. A pair of reinforcing ribs 25 (only one is shown) extend from the bottom surface of the mounting portion 22 toward the tube portion 21. The closed bottom of the tube portion 21 is further formed with a downwardly extending annular retaining sleeve 27 to be sleeved around the retaining ring 16 at the closed bottom of the housing 10 so as to position the hollow seat 20 in the housing 10. The mounting portion 22 rests on four of the upright posts 14.

The push rod 30 is a hollow rod with a restricted closed top 34 and an open bottom. The closed top 34 has two planar sides 341 and extends out of the open top of the housing 10. The push rod 30 has a surrounding wall formed with a retaining unit, such as a radial retaining groove 35, adjacent to the closed top 34 and a pair of annular peripheral grooves 31 below the retaining groove 35. An O-ring 311 is fitted in each of the peripheral grooves 31. The surrounding wall of the push rod 30 is further formed with a radial outward flange 32 adjacent to the open bottom, and an annular peripheral groove 33 immediately above the outward flange 32.

The first compression spring 40 is disposed in the push rod 30 and has a lower end portion which extends into the retaining projection 212 at the closed bottom of the tube portion 21 of the hollow seat 20.

The plug 50 is an annular body which is made of a resilient material. The plug 50 confines a through-hole 51 and is retained around the bottom end of the push rod 30 at the peripheral groove 33 and is supported on the outward flange 32. The plug 50 has a tapered periphery 52.

The tubular sleeve 60 is formed as a cylindrical tube which is provided with an external thread 61 to engage threadably the internal thread 213 of the hollow seat 20. The tubular sleeve 60 confines an axial through-hole 62 that permits the push rod 30 to extend sealingly and slidably therethrough so as to enable the latter to reach the interior 211 of the tube portion 21. The tubular sleeve 60 has a distal bottom end with an inclined inner peripheral surface 621 which complements the tapered periphery 52 of the plug 50. The tubular sleeve 60 is formed with an annular limit flange 63 adjacent to the top end thereof, thereby dividing the tubular sleeve 60 into upper and lower portions 64, 65. The lower portion 65 of the tubular sleeve 60 extends into the interior 211 of the tube portion 21 of the hollow seat 20, while the upper portion 64 is disposed in the recess 222 in the mounting portion 22 of the hollow seat 20. An annular insert groove 66, 67 is formed immediately below the limit flange 63 and at an appropriate location of the lower portion 65. An O-ring 661, 671 is received fittingly in each of the insert grooves 66, 67. The lower portion 65 of the tubular sleeve 60 is further formed with a passage means constituted by four radial water holes 68 to be aligned with the outlet pipe connector 23, and an annular peripheral groove 69 around the water holes 68. The water holes 68 and the peripheral groove 69 serve to communicate the through-hole 62 and the outlet pipe connector 23.

The bearing plate 70 is mounted on the closed top 34 of the push rod 30 and is formed as a circular plate with a convex top surface and a bottom surface which is formed with a recess 71 to receive fittingly the closed top 34 of the push rod 30 therein.

The switch assembly includes a first switch unit which comprises a switch rod 80 and a second compression spring 85. The switch rod 80 is disposed within the housing 10 on one side of the hollow seat 20. In this embodiment, the switch rod 80 is a cylindrical rod formed with a blind hole 81 that opens from a bottom end thereof. The switch rod 80 is further formed with a pair of diametrically opposite, axially extending slits 82 that extend into the blind hole 81, and a diametral pin hole 83 that extends through the blind hole 81 and that is disposed between the slits 82. A pin 84 extends through the pin hole 83. The second compression spring 85 has a first end which extends into the blind hole 81 and a second end which is sleeved on the retaining stub 17 at the closed bottom of the housing 10.

The support plate 90 is formed as a rectangular plate and is mounted on the open top of the housing 10. The support plate 90 is formed with six downwardly extending tubular sockets 91 which are formed with a respective internal thread 911 and which are to be supported on the top end of a respective one of the upright posts 14 on the housing 10. Bolts 15 (only one is shown) extend through the bottom of the housing 10, through a respective one of the upright posts 14, a respective one of the locking holes 221 on the mounting portion 22 of the hollow seat 20 and engage threadedly a respective one of the tubular sockets 91, thereby securing the support plate 90 and the hollow seat 20 to the housing 10. The support plate 90 further has a top surface which is formed with a pair of adjacent annular grooves 92. Each of the annular grooves 92 has a groove bottom 921 that inclines downwardly in a radial outward direction. A first hole 93 is formed at the center of one of the annular grooves 92 to permit the extension of the restricted closed top 34 of the push rod 30 therethrough. The shape of the first hole 93 preferably conforms with that of the closed top 34 to prevent axial rotation of the push rod 30. A second hole 94 is formed at the center of the other one of the annular grooves 92 to permit the extension of the top end of the switch rod 80 therethrough. Spaced first, second and third pairs of lugs 96, 97, 98 project downwardly from the bottom surface of the support plate 90. The lugs 96, 97, 98 of each pair are disposed on two sides of a longitudinal axis of the support plate 90 and are formed with aligned pin holes 961, 971, 981. The pin holes 981 of an endmost pair of lugs 98 adjacent to the hollow seat 20 are threaded internally and engage one end of a respective screw fastener 982.

The retaining plate 100 is disposed in the housing 10 below the support plate 90, and is formed as an elongated strip with a front end that is provided with a retaining unit, such as a projection 101, that is receivable within the retaining groove 35 of the push rod 30. The retaining plate 100 extends between the first and second pairs of lugs 96, 97 and is formed with a pair of longitudinally extending slots 102 adjacent to the front and rear ends thereof. The slots 102 are aligned with the pin holes 961, 971, and a pair of pins 103 extend respectively through one of the slots 102 and mount the retaining plate 100 onto one of the first and second pairs of lugs 96, 97. The support plate 90 thus supports the retaining plate 100 movably in a lateral direction toward and away from the push rod 30. The retaining plate 100 is further formed with a rearwardly inclining slot 104 which is disposed between the slots 102 and which permits the extension of the pin 84 therethrough, and a threaded hole 105 between the slot 104 and the front end of the retaining plate 100. Two screws 106 engage the threaded hole 105 on two sides of the retaining plate 100.

The extension springs 110 are disposed on two sides of the retaining plate 100. Each of the extension springs 110 has a first end secured to one of the screw fasteners 982, and a second end secured to one of the screws 106. The extension springs 110 thus bias the retaining plate 100 toward the push rod 30.

Each of the resilient cups 120 is provided on top of the support plate 90 and is formed as a hemispherical shell. Each resilient cup 120 has a peripheral flange 121 which is received in a respective one of the annular grooves 92 on the support plate 90. The peripheral flange 121 has an inclined bottom surface 1210 which complements the inclined groove bottom 921 of the respective annular groove 92. The bottom surface of one of the resilient cups 120 is formed with an annular retaining sleeve 122 which receives the bearing plate 70 therein. Each resilient cup 120 further has a top surface formed with an anti-slip projection 123, preferably in the form of a decorative pattern.

The top cover 130 is mounted on the open top of the housing 10 and is formed as a rectangular plate with six locking holes 131 and a pair of openings 132. Screws 133 (only one is shown) extend through the locking holes 131 and engage a respective one of the tubular sockets 91 to fasten the top cover 130 on the support plate 90. The openings 132 are sized so as to permit the projection of the resilient cups 120 therethrough while pressing the flanges 121 of the resilient cups 120 against the support plate 90.

In use, outlet and inlet water pipes 28, 29 are inserted into the housing 10 via the water outlet and inlet holes 11, 12 and are connected threadedly to the outlet and inlet pipe connectors 23, 24 of the hollow seat 20.

Initially, when no pressure is applied on either of the resilient cups 120, the first compression spring 40 biases the push rod 30 upwardly such that the plug 50 abuts tightly against the inclined surface 621 of the tubular sleeve 60, thereby closing the bottom end of the latter. The O-ring 671 on the lower portion 65 of the tubular sleeve 60 is in tight contact with the inner wall surface of the tube portion 21, thereby preventing water which flows into the hollow seat 20 via the inlet water pipe 29 and the inlet pipe connector 24 from entering the through-hole 62 of the tubular sleeve 60 to prevent correspondingly the water in the hollow seat 20 from reaching the outlet pipe connector 23 and the outlet water pipe 28. In addition, the projection 101 of the retaining plate 100 abuts a portion of the push rod 30 below the retaining groove 35. The extension springs 110 are tensed at this stage.

Figure 4:
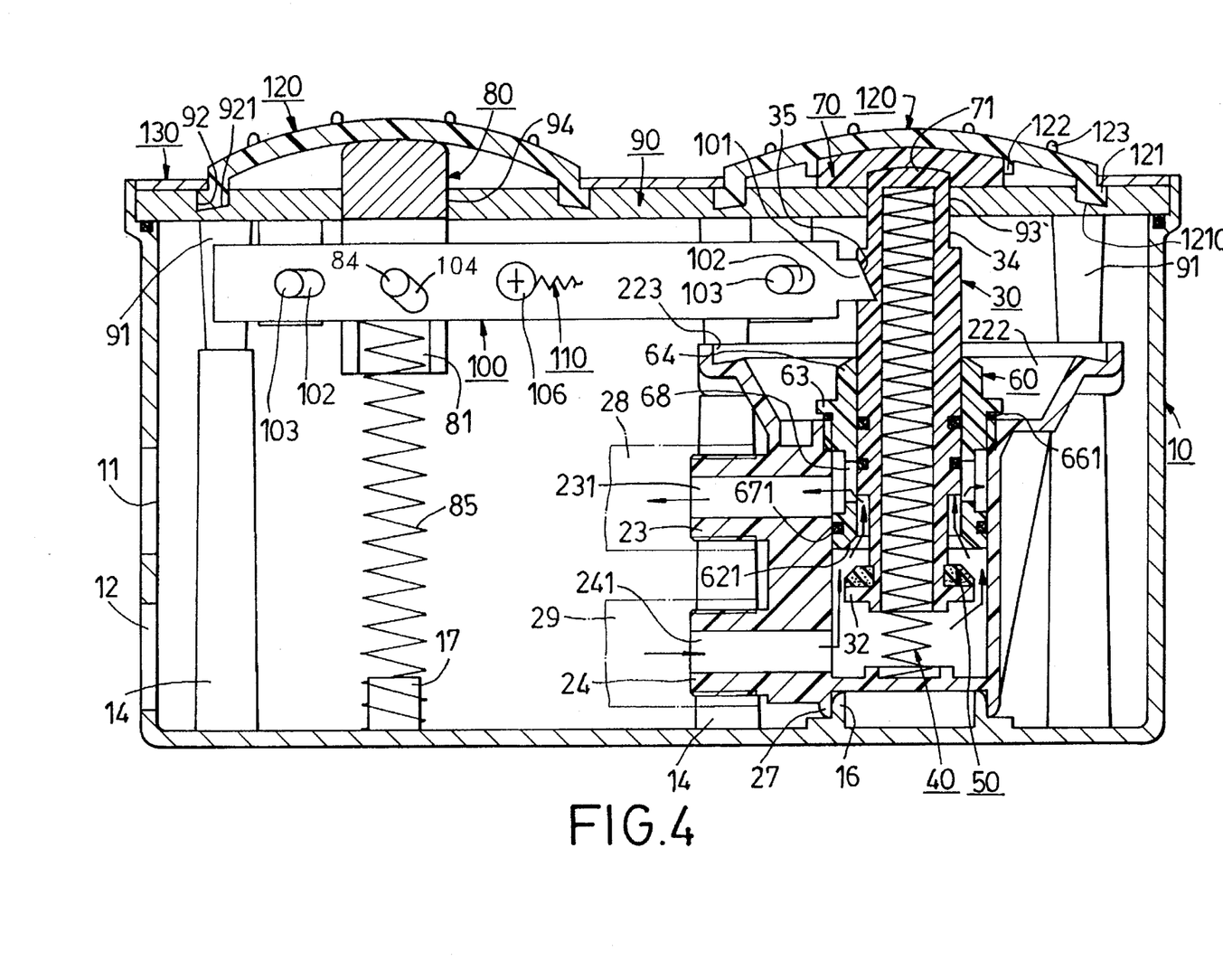
FIG. 4 is a sectional view which illustrates the first preferred embodiment when in a water supplying state.

Referring to FIG. 4, when the resilient cup 120 above the push rod 30 is pressed, the push rod 30 moves downwardly to compress the first compression spring 40. At this stage, the plug 50 ceases to abut the inclined surface 621 of the tubular sleeve 60, thereby permitting water to flow through the annular peripheral groove 33 of the push rod 30 and the through-hole 62, the water holes 68 and the annular peripheral groove 69 of the tubular sleeve 60 so as to reach the outlet pipe connector 23 and the outlet water pipe 28. At the same time, the projection 101 of the retaining plate 100 extends into the retaining groove 35 and engages the push rod 30 due to the action of the extension springs 110. Thus, the push rod 30 is prevented by the retaining plate 100 from moving upwards even when the downward pressure applied on the push rod 30 is extinguished to ensure a continuous flow of water through the outlet water pipe 28. Furthermore, due to the forward lateral movement of the retaining plate 100, the pin 84 is moved from a lower portion of the slot 104 to an upper portion of the latter, thereby causing the second compression spring 85 to expand and urge the switch rod 80 to contact the bottom surface of the resilient cup 120 that is disposed above the latter.

When the resilient cup 120 above the switch rod 80 is pressed, the switch rod 80 moves downwardly to compress the second compression spring 85. At the same time, the pin 84 moves from the upper portion of the slot 104 to the lower portion of the same, thereby causing rearward lateral movement of the retaining plate 100 against the action of the extension springs 110. The projection 101 of the retaining plate 100 is removed from the retaining groove 35, thereby permitting the expansion of the first compression spring 40 to bias the push rod 30 upwardly so that the plug 50 abuts tightly against the inclined surface 621 of the tubular sleeve 62, as shown in FIG. 3. Water ceases to flow through the outlet water pipe 28 at this stage.

It is noted that in this embodiment, the closed top 34 of the push rod 30 has two parallel sides 341, while the shape of the first hole 93 in the support plate 90 corresponds to that of the closed top 34. Thus, axial rotation of the push rod 30 is prevented to prevent correspondingly misalignment between the retaining groove 35 on the push rod 30 and the projection 101 of the retaining plate 100. Furthermore, the provision of the tubular sockets 91 serve to increase the movable range of the push rod 30.

Figure 5:
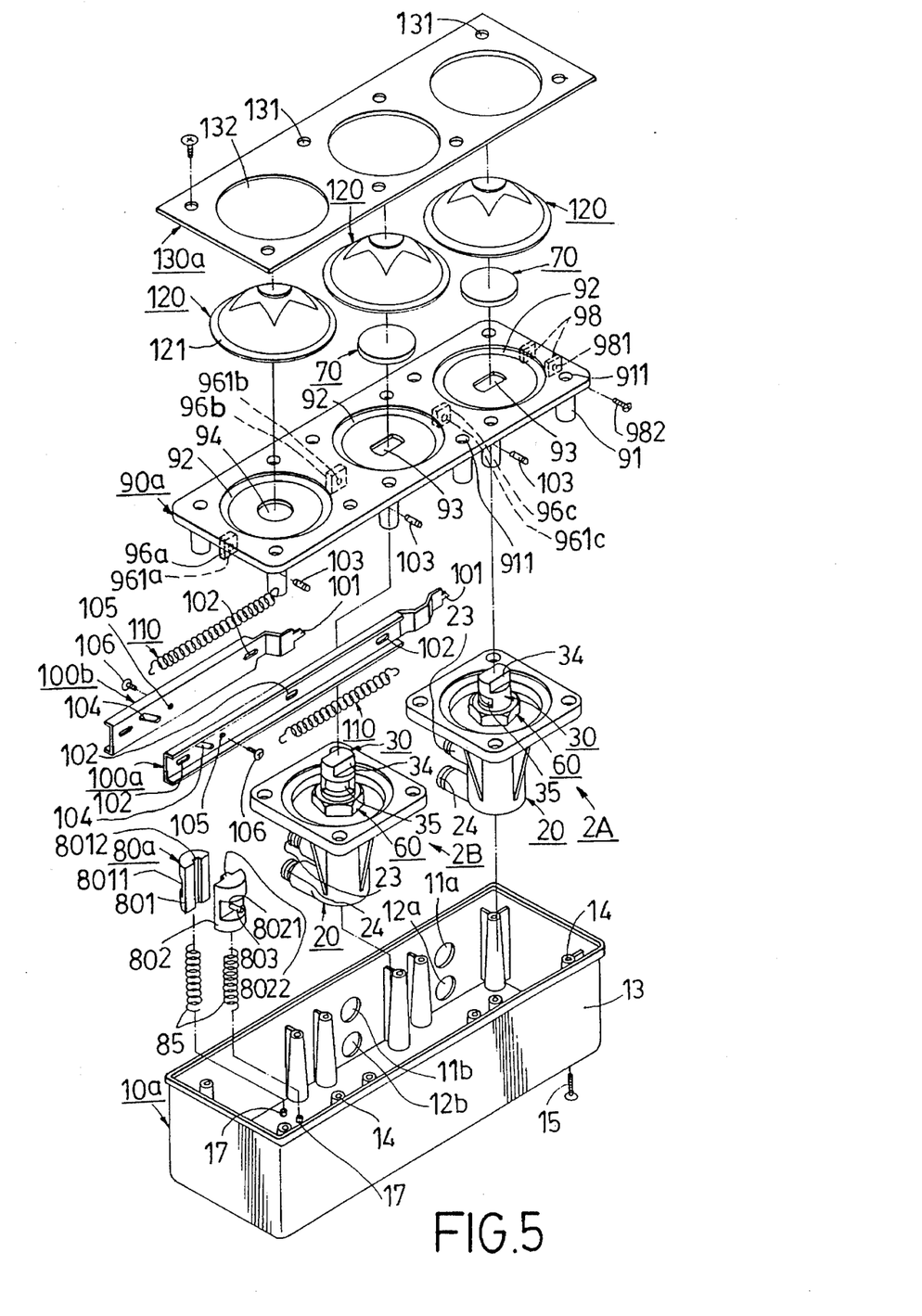
FIG. 5 is an exploded view of the second preferred embodiment of a foot-operated valve according to the present invention.
Figure 6:
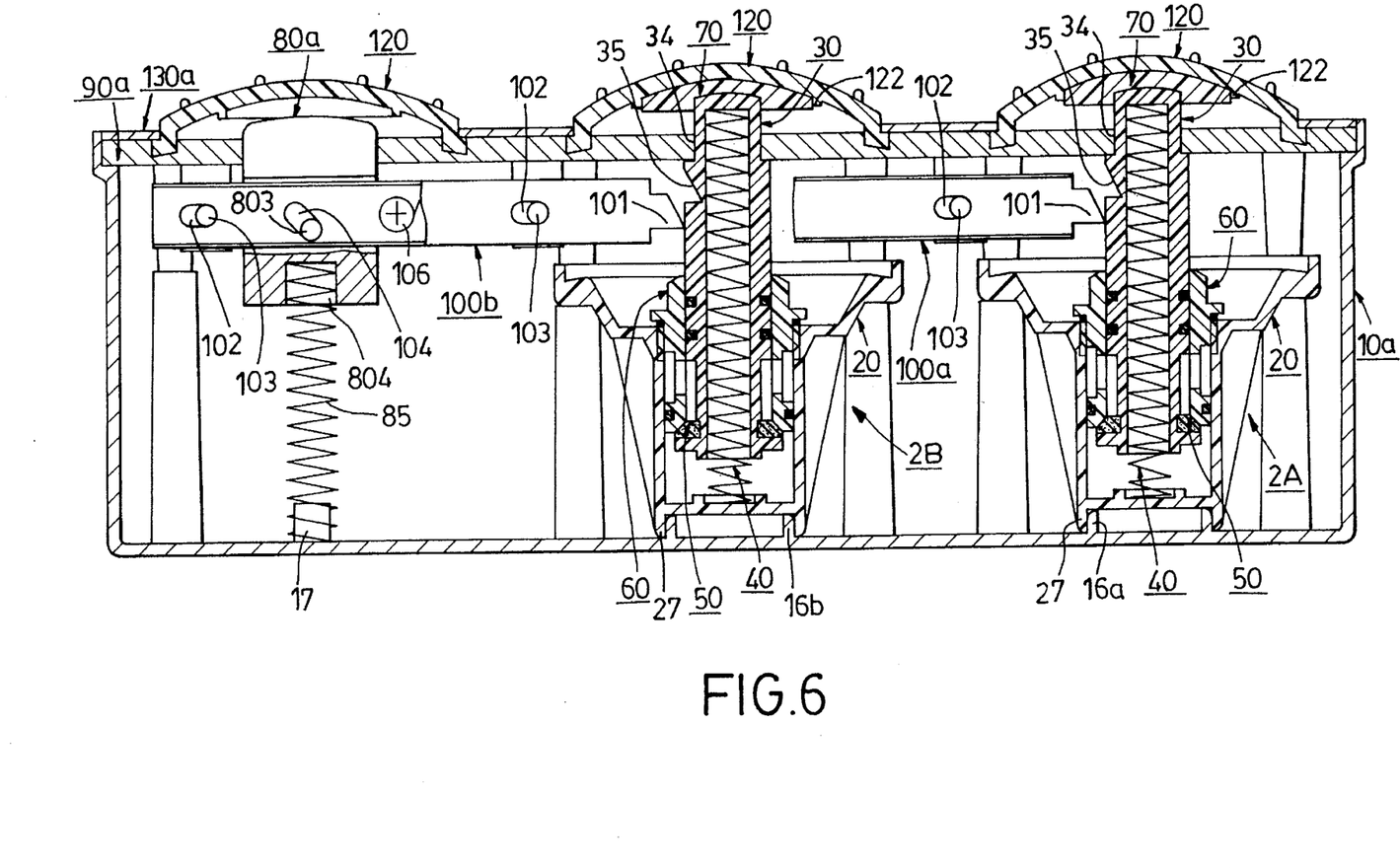
FIG. 6 is sectional view which illustrates the second preferred embodiment when in a closed state.

Referring to FIGS. 5 and 6, the second preferred embodiment of a foot-operated valve according to the present invention is adapted for use in a hot-and-cold water system and is shown to comprise a housing 10a, first and second valve sets 2A, 2B, a pair of bearing plates 70, a switch assembly 80a, a support plate 90a, a retaining plate unit including longer and shorter plates 100a, 100b, two extension springs 110, three resilient cups 120 and a top cover 130a.

The housing 10a is a rectangular hollow body with an open top, a closed bottom and a surrounding wall 13 formed with two sets of vertically aligned water outlet and inlet holes 11a, 12a, 11b, 12b. In this embodiment, twelve hollow upright posts 14 are formed on an inner wall surface of the surrounding wall 13 such that the top ends of the upright posts 14 are spaced from a topmost periphery of the surrounding wall 13. The closed bottom of the housing 10a has an upper surface formed with two upwardly protruding annular retaining projections 16a, 16b and two upwardly protruding retaining stubs 17.

The valve sets 2A, 2B are similar in construction to the valve set of the previous embodiment and include a hollow seat 20, an upright push rod 30, a first compression spring 40, a plug 50 and a tubular sleeve 60. The valve sets 2A, 2B are positioned in the housing 10a by mounting the retaining sleeve 27 of the valve seat 20 of the valve sets 2A, 2B on a respective one of the retaining projections 16a, 16b. The valve seat 20 of each valve set 2A, 2B has a set of vertically aligned outlet and inlet pipe connectors 23, 24 aligned with a respective set of water outlet and inlet holes 11a, 12a, 11b, 12b of the housing 10a.

The switch assembly 80a is disposed within the housing 10a on one side of the second valve set 2B. In this embodiment, the switch assembly 80a comprises first and second switch units, each of which including a switch rod 802, 801 and a second compression spring 85. The switch rods 802, 801 are formed as a pair of matching longitudinal cylindrical halves and respectively have a curved peripheral surface with a positioning notch 8021, 8011 that is transverse to the axis of the switch rods 802, 801, and a radial pin 803 that extends into the notch 8021, 8011. Each of the switch rods 802, 801 further has a bottom end formed with a blind hole 804. Each of the second compression springs 85 has a first end extending into the blind hole 804 of a respective one of the switch rods 802, 801 and a second end sleeved on a respective one of the retaining stubs 17 on the closed bottom of the housing 10a. The switch rod 801 further has a planar surface formed with an axially extending keyway 8012 which receives an axially extending key 8022 on a planar surface of the switch rod 802.

The support plate 90a is formed as a rectangular plate and is mounted on the open top of the housing 10a. The support plate 90a is formed with twelve downwardly extending tubular sockets 91 which are formed with a respective internal thread 911 and which are to be supported on the top end of a respective one of the upright posts 14 on the housing 10a. Bolts 15 (only one is shown) extend through the bottom of the housing 10a, through a respective one of the upright posts 14, a respective one of the locking holes 221 on the mounting portion 22 of the hollow seats 20 of the valve sets 2A, 2B, and engage threadedly a respective one of the tubular sockets 91, thereby securing the support plate 90 and the hollow seats 20 of the valve sets 2A, 2B to the housing 10. The support plate 90a further has a top surface which is formed with three adjacent annular grooves 92. A hole 93 is formed at the center of two of the annular grooves 92 which are disposed above the first and second valve sets 2A, 2B to permit the extension of the restricted closed top 34 of the corresponding push rod 30 therethrough. As with the previous embodiment, the shape of the holes 93 preferably conforms with that of the closed top 34 of the push rods 30 to prevent axial rotation of the latter. A hole 94 is formed at the center of the remaining annular groove 92 to permit the extension of the top ends of the switch rods 802, 801 therethrough. Spaced lugs 96a, 96b, 96c project downwardly from the bottom surface of the support plate 90a and are formed with a respective pin hole 961a, 961b, 961c. A pair of lugs 98 similarly project downwardly from the bottom surface of the support plate 90a on one end of the latter adjacent to the valve set 2A. The lugs 98 are formed with aligned pin holes 981 that are threaded internally and engage one end of a respective screw fastener 982.

The longer plate 100a is disposed in the housing 10a below the support plate 90a, and is formed as an elongated strip with a front end that is provided with a retaining unit, such as a projection 101, that is receivable within the retaining groove 35 of the push rod 30 of the first valve set 2A. The longer plate 100a is formed with three longitudinally extending slots 102 that are aligned with the pin holes 961a, 961b, 961c. Pins 103 extend respectively through one of the slots 102 and mount the longer plate 100a onto one of the lugs 96a, 96b, 96c. The support plate 90a thus supports the longer plate 100a movably in a lateral direction toward and away from the push rod 30 of the first valve set 2A. The longer plate 100a is further formed with a rearwardly inclining slot 104 which is disposed between two of the slots 102. The longer plate 100a extends into the positioning notch 8021 of the switch rod 802 such that the pin 803 of the latter extends through the slot 104. The longer plate 100a is further formed with a threaded hole 105 adjacent to the slot 104. A screw 106 engages the threaded hole 105.

The shorter plate 100b is similarly disposed in the housing 10a below the support plate 90a, and is also formed as an elongated strip with a front end that is provided with a retaining unit, such as a projection 101, that is receivable within the retaining groove 35 of the push rod 30. The shorter plate 100b is formed with two longitudinally extending slots 102 that are adjacent to the front and rear ends thereof and that are aligned with the pin holes 961a, 961b. The pins 103 which extend through the lugs 96a, 96b similarly extend into the slots 102 of the shorter plate 100b to mount the shorter plate 100b onto the lugs 96a, 96b, thereby enabling the support plate 90a to support movably the shorter plate 100b in a lateral direction toward and away from the push rod 30 of the second valve set 2B. The shorter plate 100b is further formed with a rearwardly inclining slot 104 which is disposed between the slots 102 thereof. The shorter plate 100b extends into the positioning notch 8011 of the switch rod 801 such that the pin 803 of the latter extends through the slot 104. The shorter plate 100b is also formed with a threaded hole 105 adjacent to the slot 104 thereof. Another screw 106 engages the threaded hole 105 of the shorter plate 100b.

The extension springs 110 are disposed on two sides of the retaining plate unit. Each of the extension springs 110 has a first end secured to the screw fastener 982, and a second end secured to one of the screws 106. The extension springs 110 thus bias the longer and shorter plates 100a, 100b toward the push rod 30 of the respective valve set 2A, 2B.

Each of the resilient cups 120 is provided on top of the support plate 90 and is formed as a hemispherical shell. Each resilient cup 120 has a peripheral flange 121 which is received in a respective one of the annular grooves 92 on the support plate 90. The bottom surfaces of the resilient cups 120 that are above the valve sets 2A, 2B are formed with a respective annular retaining sleeve 122 to receive one of the bearing plates 70 therein.

The top cover 130a is mounted on the open top of the housing 10a and is formed as a rectangular plate with eight locking holes 131 and three openings 132. Screws 133 (only one is shown) extend through the locking holes 131 and engage a respective one of the tubular sockets 91 to fasten the top cover 130a onto the support plate 90a. The openings 132 are sized so as to permit the projection of the resilient cups 120 therethrough while pressing the flanges 121 of the latter against the support plate 90a.

In use, the hollow seats 20 of the valve sets 2A, 2B are connected to a respective one of a set of hot water inlet and outlet pipes (not shown) and a set of cold water inlet and outlet pipes (not shown).

Referring again to FIG. 6, initially, when no pressure is applied on the push rod 30 of the first valve set 20A, the projection 101 of the longer plate 100a abuts a portion of the push rod 30 below the retaining groove 35, and the corresponding extension spring 110 is tensed.

Figure 7:
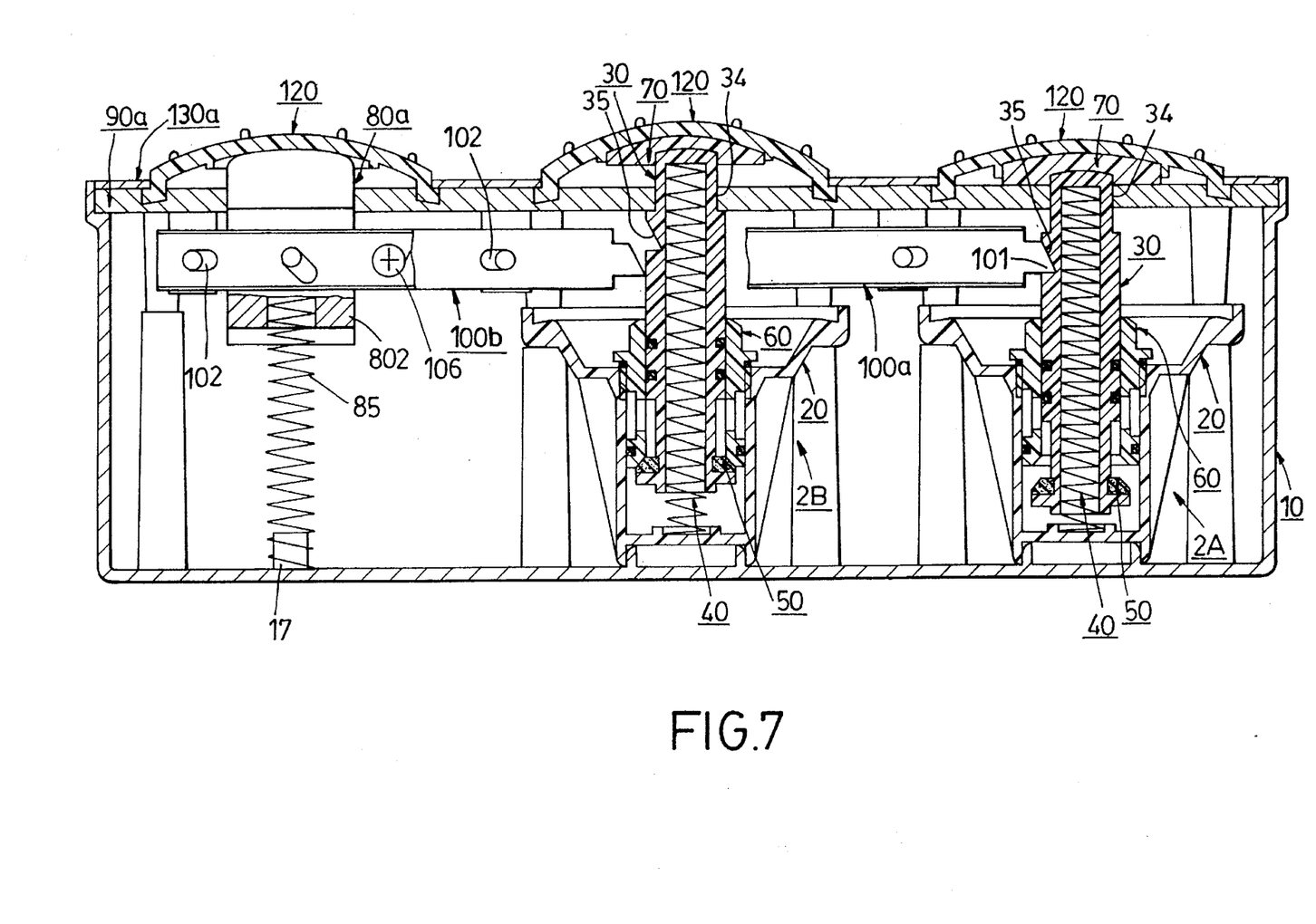
FIG. 7 is a sectional view which illustrates the second preferred embodiment when in a water supplying state.

Referring to FIG. 7, when the resilient cup 120 above the push rod 30 of the first valve set 2A is pressed, the push rod 30 moves downwardly to compress the first compression spring 40. At this stage, the projection 101 of the longer plate 100a extends into the retaining groove 35 and engages the push rod 30 due to the action of the corresponding extension spring 110, thereby preventing the push rod 30 from moving upwards even when the downward pressure applied thereon is extinguished to ensure a continuous flow of water in and out of the hollow seat 20. Due to the forward lateral movement of the longer plate 100a, the pin 803 on the switch rod 802 moves from a lower portion of the slot 104 of the longer plate 100a to an upper portion of the latter, thereby causing the corresponding compression spring 85 to expand and urge the switch rod 802 to contact the bottom surface of the resilient cup 120 that is disposed above the latter.

When the resilient cup 120 above the switch assembly 80a is pressed, the switch rod 802 moves downwardly to compress the corresponding compression spring 85. At the same time, the pin 803 on the switch rod 802 moves from the upper portion of the slot 104 of the longer plate 100a to the lower portion of the same, thereby causing rearward lateral movement of the longer plate 100a against the action of the corresponding extension spring 110. The projection 101 of the longer plate 100a is removed from the retaining groove 35 of the push rod 30 of the first valve set 2A, thereby permitting the expansion of the first compression spring 40 to bias the push rod 30 of the first valve set 2A upwardly, as shown in FIG. 6. Water ceases to flow through the first valve set 2A at this stage.

The operation of the second valve set 2B is similar to that of the first valve set 2A and will not be detailed further.

It is worthwhile to note that the first and second valve sets 2A, 2B may be operated separately or at the same time. This is possible due to the key-and-keyway connection between the switch rods 802, 801 of the switch assembly 80a. When the valve sets 2A, 2B are operated at the same time, water flow therethrough can be stopped simultaneously when pressure is applied on the switch assembly 80a.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A foot-operated valve, comprising: a housing having an open top, a closed bottom and a surrounding wall formed with a first set of water outlet and inlet holes, one of said water outlet and inlet holes being disposed at a level higher than the other one of said water outlet and inlet holes;

a support plate mounted on said open top of said housing and formed with a first hole;

a first valve set including: a hollow seat secured in said housing below said support plate, said seat having an upright tube portion with an open top and a closed bottom, said tube portion confining an interior and being formed with radially extending outlet and inlet pipe connectors aligned with said first set of water inlet and outlet holes and communicated with said interior of said tube portion; a tubular sleeve secured to and extending into said tube portion, said tubular sleeve confining an axial through-hole and being formed with a passage means to communicate said through-hole and said outlet pipe connector; a push rod extending sealingly and slidably through said tubular sleeve and into said tube portion of said hollow seat, said push rod having a top end which extends out of said open top of said housing via said first hole of said support plate and a bottom end which has a plug secured therearound, said push rod being formed with an annular peripheral groove immediately above said plug and a radial first retaining unit adjacent said top end; and a first compression spring means provided in said upright tube portion and interposed between said closed bottom of said tube portion and said push rod to bias said push rod upwardly so that said plug closes normally a distal bottom end of said tubular sleeve, application of pressure on said top end of said push rod against action of said first compression spring means moving said plug away from said distal bottom end of said tubular sleeve so as to permit water entering said inlet pipe connector to reach said outlet pipe connector via said interior of said tube portion, said annular peripheral groove of said push rod, and said through-hole and said passage means of said tubular sleeve;

a retaining plate unit disposed below said support plate, said retaining plate unit including an elongated first plate supported movably by said support plate and movable in a lateral direction towards and away from said push rod of said first valve set, said first plate having a rear end and a front end formed with a second retaining unit;

an extension spring means for biasing said second retaining unit of said first plate toward said push rod of said first valve set to enable said second retaining unit to engage said first retaining unit on said push rod when pressure is applied on said top end of said push rod; and a switch assembly including a first switch means operable selectively so as to pull said first plate against action of said extension spring means in order to disengage said second retaining unit from said first retaining unit, thereby permitting said first compression spring means to bias said push rod so that said plug closes said distal bottom end of said tubular sleeve.

2. The foot-operated valve as claimed in claim 1, wherein said first plate is formed with a pair of longitudinally extending slots, each of which being disposed adjacent to a respective one of said front and rear ends of said first plate, said support plate being formed with a pair of downwardly extending lugs, each of said lugs having a pin extending into a respective one of said slots of said first plate.

3. The foot-operated valve as claimed in claim 1, wherein said first retaining unit is a radial retaining groove, and said second retaining unit is a projection receivable in said retaining groove.

4. The foot-operated valve as claimed in claim 1, wherein said support plate is formed with a second hole and said first switch means comprises a switch rod connected to said first plate and a second compression spring means biasing said switch rod to extend out of said open top of said housing via said second hole of said support plate, said switch rod pulling said first plate so as to disengage said second retaining unit from said first retaining unit when downward pressure is applied on said switch rod.

5. The foot-operated valve as claimed in claim 4 wherein said first plate is formed with a rearwardly inclining slot and said switch rod is formed with a pin that extends into said slot.

6. The foot-operated valve as claimed in claim 4, wherein said support plate has a top surface formed with a pair of annular grooves, each of which being disposed around a respective one of said first and second holes, said foot operated valve further comprising a pair of resilient cups, each of which being formed as a hemispherical shell and having a peripheral flange received in a respective one of said annular grooves.

7. The foot-operated valve as claimed in claim 6, further comprising a top cover mounted on said open top of said housing above said support plate, said top cover being formed with a pair of openings having a size sufficient to permit projection of said resilient cups therethrough, said top cover pressing said peripheral flange of each of said resilient cups against said support plate.

8. The foot-operated valve as claimed in claim 7, wherein each of said annular grooves has a groove bottom that inclines downwardly in a radial outward direction, and said peripheral flange of each of said resilient cups has an inclined bottom surface which complements said groove bottom of the respective one of said annular grooves.

9. The foot-operated valve as claimed in claim 6, wherein each of said resilient cups has a top surface formed with an anti-slip projection.

10. The foot-operated valve as claimed in claim 6, wherein said top end of said push rod has a bearing plate mounted thereon, said bearing plate having a convex top surface that complements and that is in contact with a bottom surface of one of said resilient cups.

11. The foot-operated valve as claimed in claim 10, wherein said bottom surface of said one of said resilient cups is formed with a looped retaining sleeve which receives said bearing plate therein.

12. The foot-operated valve as claimed in claim 1, wherein:

said surrounding wall of said housing is further formed with a second set of water outlet and inlet holes;

said foot-operated valve further comprising a second valve set similar to said first valve set in construction, said second valve set having a hollow seat with an upright tube portion that is formed with radially extending outlet and inlet pipe connectors aligned with said second set of water inlet and outlet holes, and a push rod extending movably into said tube portion of said hollow seat and being formed with said radial first retaining unit;

said retaining plate unit further including an elongated second plate supported movably by said support plate and movable in a lateral direction towards and away from said push rod of said second valve set, said second plate having a rear end and a front end formed with said second retaining unit;

said extension spring means further biasing said second retaining unit of said second plate toward said push rod of said second valve set to enable said second retaining unit of said second plate to engage said first retaining unit on said push rod of said second valve set when pressure is applied on said push rod of said second valve set; and said switch assembly further including a second switch means operable selectively so as to pull said second plate against action of said extension spring means in order to disengage said second retaining unit of said second plate from said first retaining unit on said push rod of said second valve set.

13. The foot-operated valve as claimed in claim 12, wherein said support plate is formed with a second hole and each of said first and second switch means comprises a switch rod connected to a respective one of said first and second plates and a second compression spring means biasing said switch rod to extend out of said open top of said housing via said second hole of said support plate, said switch rod pulling the respective one of said first and second plates so as to disengage said second retaining unit of the respective one of said first and second plates from the corresponding said first retaining unit when downward pressure is applied on said switch rod.

14. The foot-operated valve as claimed in claim 13, wherein each of said first and second plates is formed with a rearwardly inclining slot and said switch rod of each of said first and second switch means is formed with a pin that extends into said slot of the respective one of said first and second plates.

15. The foot-operated valve as claimed in claim 13, wherein said switch rod of one of said first and second switch means is formed with a vertically extending keyway, and said switch rod of the other one of said first and second switch means is formed with a key extending slidably into said keyway.

* * * * *